United States Patent [19]

Kuwabara et al.

[11] Patent Number: 4,568,608
[45] Date of Patent: Feb. 4, 1986

[54] PRE-FOAMED PARTICLES OF POLYPROPYLENE-BASE RESIN

[75] Inventors: Hideki Kuwabara, Hadano; Toru Yamaguchi, Utsunomiya; Atushi Kitagawa, Fujisawa, all of Japan

[73] Assignee: Japan Styrene Paper Corporation, Tokyo, Japan

[21] Appl. No.: 730,785

[22] Filed: May 6, 1985

[30] Foreign Application Priority Data

May 8, 1984 [JP] Japan ................................. 59-91502

[51] Int. Cl.$^4$ .......................... C08J 9/18; B32B 27/00
[52] U.S. Cl. ..................................... 428/402; 521/58; 521/59; 521/144
[58] Field of Search .......................... 521/58, 59, 144; 428/402

[56] References Cited

U.S. PATENT DOCUMENTS

| 3,250,730 | 5/1966 | Palmer | 521/58 |
| 3,341,481 | 9/1967 | Palmer | 521/58 |
| 4,448,901 | 5/1984 | Senda et al. | 521/58 |
| 4,510,292 | 4/1985 | Chiba et al. | 521/144 |
| 4,540,718 | 9/1985 | Senda et al. | 521/58 |

Primary Examiner—William J. Van Balen
Attorney, Agent, or Firm—Saul Jecies

[57] ABSTRACT

In pre-foamed particles of a propylene-base resin obtained by foaming raw particles of the propylene-base resin, the relation, $G_1-G_2 \geqq 10\%$, exists between the content $G_1$ (%) of matter, which is contained in the pre-foamed particles and is insoluble in boiling n-heptane, and the content $G_2$ (%) of matter contained in the raw particles and insoluble in boiling n-heptane. The pre-foamed particles have excellent moldability and can hence provide with ease low-density (highly-expanded) molded articles, which enjoy superb dimensional accuracy, good surface conditions, low percent water absorption, excellent impact and chemical resistance.

6 Claims, No Drawings

PRE-FOAMED PARTICLES OF POLYPROPYLENE-BASE RESIN

This invention relates to substantially-uncrosslinked pre-foamed particles of a polypropylene-base resin, which have good moldability and can provide excellent molded articles, which may hereinafter be called "moldings".

So-called expanded bead moldings obtained by filling pre-foamed particles in their corresponding molds and then heating them to expand in situ are excellent in cushioning properties, heat-insulating properties and the like and have found wide-spread commercial utility as cushioning materials, wrapping materials, heat-insulating materials, building materials, etc. There is an ever-increasing demand for such materials in recent years.

As molded articles of the above sort, molded articles obtained from pre-foamed polystyrene particles have conventionally been known. However, expanded polystyrene moldings are accompanied by a fatal drawback that they are brittle, and in addition, by a shortcoming that they have poor chemical resistance. Improvement to such deficiencies have long been waited for. As a solution to such deficiencies, molded articles obtained from pre-foamed particles of crosslinked polyethylene were proposed. However, it was difficult to obtain low-density (i.e., highly-expanded) moldings by molding technique when pre-foamed particles of crosslinked polyethylene was relied upon. When one strived to obtain low-density molded articles in spite of the above-mentioned difficulties, it was only possible to obtain molded articles having poor physical properties such as substantial shrinkage and great hygroscopicity. It was thus hardly feasible to obtain practically-usable molded articles.

With the foregoing in view, the present inventors were interested with the excellent physical properties of polypropylene-base resins and carried out a research on molded articles made from pre-foamed particles of polypropylene-base resins with a view toward solving the above-described deficiencies of conventional molded articles. Use of pre-foamed particles of polypropylene-base resins however involved such a problem that good molded articles were not always obtained stably, namely, it was in some instances possible to obtain molded articles featuring low density (high expansion) and low percent water absorption and having small shrinkage factor and excellent dimensional stability, but in some other instances, it was only possible to obtain molded articles having large shrinkage factors. The present inventors has carried out a further extensive research with a view toward finding out causes for the above problem. As a result, it has been uncovered that pre-foamed particles of a polypropylene-base resin, in which pre-foamed particles the content of matter insoluble in boiling n-heptane is higher by 10% or more than the content of matter insoluble in boiling n-heptane and contained in its corresponding raw resin particles, are excellent in moldability and can stably provide molded articles having superb physical properties, leading to completion of this invention.

In one aspect of this invention, there is thus provided pre-foamed particles of a propylene-base resin obtained by foaming raw particles of the propylene-base resin, characterized in that the relation, $G_1-G_2>10\%$, exists between the content $G_1$ (%) of matter, which is contained in the pre-foamed particles and is insoluble in boiling n-heptane, and the content $G_2$ (%) of matter contained in the raw particles and insoluble in boiling n-heptane.

The pre-foamed particles of this invention have various advantageous effects. For example, they have excellent moldability and can hence provide with ease low-density (highly-expanded) molded articles, and moreover, they can stably provde molded articles having superb dimensional accuracy, good surface conditions and low percent water absorption (in other words, formed of well fusion-bonded expanded particles). In addition, molded articles obtained from the pre-foamed particles of this invention are free of the drawback of molded articles obtained from pre-foamed particles of a polystyrene-base resin that the latter are brittle, and have excellent impact and chemical resistance. Even when molded into articles having lower density (or higher expansion ratios) than molded articles made from pre-foamed particles of crosslinked polyethylene, the pre-foamed particles of this invention can still provide excellent molded articles having small shrinkage factors and percent water absorption.

In this invention, it is possible to use, as the polypropylene-base resin, a propylene homopolymer, ethylene-propylene block copolymer, ethylene-propylene random copolymer, propylene-1-butene random copolymer, ethylene-propylene-1-butene random copolymer or the like. Use of a propylene-base random copolymer such as ethylene-propylene random copolymer or propylene-1-butene random copolymer is particularly preferred. It is also possible to use a rubber, thermoplastic elastomer or the like in combination with the above-described polypropylene-base resin. As a rubber usable in combination with the polypropylene-base resin, may for example be mentioned an ethylene-propylene rubber such as an ethylene-propylene copolymer (EPM) or a terpolymer (EPDM) of ethylene, propylene and a small amount of a diene component. As an exemplary thermoplastic elastomer, may be mentioned a styrene-base thermoplastic elastomer, the soft segments of which are composed of a polyolefin such as polyethylene or polypropylene while the hard segments of which are made of polystyrene, or a thermoplastic polyolefin elastomer the soft segments of which are formed of an amorphous ethylene-propylene copolymer while the hard segments of which are composed of a polyolefin such as polyethylene or polypropylene.

The pre-foamed particles of this invention are those satisfying the inequality, $G_1-G_2 \geq 10\%$ or preferably $G_1-G_2 \geq 15\%$ wherein $G_1$ (%) means the content of matter insoluble in boiling n-heptane and contained in the pre-foamed particles and $G_2$ (%) denotes the content of matter insoluble in boiling n-heptane and contained in the raw resin particles employed for the preparation of the pre-foamed particles. Pre-foamed particles satisfying $G_1-G_2 \leq 10\%$ have poor moldability and cannot thus provide molded articles having excellent dimensional accuracy and surface conditions and small percent water absorption. The values $G_1,G_2$ vary depending on the melt flow rate (MFR) of each raw resin, the type of each additive contained in the raw resin, their thermal history, etc. In the present invention, it is necessary to employ raw resin particles containing 90% or less of matter insoluble in boiling n-heptane ($G_2 \leq 90\%$) with 40% or less being preferred. On the other hand, pre-foamed particles are required to contain 10% or more of matter insoluble in boiling n-heptane ($G_1 \geqq 10\%$) with 20% or more being preferred. In the present invention, each content of matter insoluble in boiling n-heptane indicates, in terms of percentage, the proportion of the weight of insoluble matter, which was obtained by boiling the corresponding sample for 8 hours in boiling n-heptane, separating the insoluble matter and then drying it at 80° C., under a reduced pressure of 2 mmHg and for 8 hours, to the weight of the sample before its boiling. The content of matter insoluble in boiling n-heptane is closely correlated to the stereoregularity of its corresponding polypropylene resin. A difference, which generally exists between the content of matter insoluble in boiling n-heptane and contained in each raw resin and that of its corresponding pre-foamed particles, seems to be attributable to the difference in crystalline structure between the raw resin and pre-foamed particles. In the case of pre-foamed particles, they are used, as they are, as samples for measuring the contents of matter insoluble in boiling n-heptane and contained therein. In the case of raw resin particles, they are used as samples by hot-pressing them into a sheet of about 100 μm thick in accordance with the sample piece preparation method described in JIS-K6758 and then cutting the sheet into small pieces of 3 mm square.

Prefoamed particles of a polypropylene-base resin, which particles pertain to this invention, can be obtained, for example, by charging raw particles of the polypropylene-base resin, and per every 100 parts by weight of the raw particles, 100–400 parts by weight of water, 5–30 parts by weight of a volatile foaming agent (for example, dichlorodifluoromethane) and 0.1–3 parts by weight of a dispersing agent (for example, fine aluminum oxide particles) in a sealed vessel; heating the resultant mixture to a temperature close to their melting point; holding the mixture temporarily at a temperature below the fusing completion temperature $T_E$ without allowing its temperature to exceed $T_E$; and after holding the mixture at a temperature above the first-mentioned holding temperature but below $T_E + 5°$ C., releasing one end of the vessel to release the resin particles and water from the vessel into a low-pressure atmosphere to cause the resin particles to expand. Here, $T_E$ means the completion temperature of fusion of a polypropylene-base resin, which is determined in the following manner in the present invention. Namely, 6–8 mg of the sample resin is heated to 220° C. at a temperature-raising rate of 10° C./minute in a differential scanning calorimeter and is then cooled to about 40° C. at a temperature-lowering rate of 10° C./minute, followed again by its heating to 220° C. at a temperature-raising rate of 10° C./minute. The temperature corresponding to the top of the endothermic peak of the DSC curve obtained by the second heating is designated by $T_m$, while the temperature at which the slope of the peak has returned on the high temperature side to the level of the base line is designated by $T_E$.

Pre-foamed particles satisfying the relation $G_1 - G_2 \geqq 10\%$ can be obtained by tentatively holding resin particles at a first temperature lower than the fusing completion temperature $T_E$ without raising their temperature to any temperature above $T_E$ and then holding the resin particles at a second temperature above the first temperature but below $T_E + 5°$ C. as mentioned above. If the resin particles, which are to be pre-foamed, should be heated to any temperature above $T_E$ prior to holding them at the first temperature or if their holding time at the first temperature should be insufficient, the effects of this invention will not be brought about even if the second temperature (namely, the foaming temperature) is set above $T_E$. If a foaming temperature should be selected at a level above $T_E + 5°$ C., the effects of this invention will be insufficient and $G_1$ of the resulting pre-foamed particles will not satisfy the relation $G_1 - G_2 \geqq 10\%$ relative to $G_2$ of the raw resin particles employed for the foaming.

This invention will hereinafter be described in further detail by the following Examples and Comparative Examples:

EXAMPLES 1–9 & COMPARATIVE EXAMPLES 1–4

Charged in a sealed vessel were 100 parts by weight of resin particles having their corresponding fusing completion temperature $T_E$ and content $G_2$ of matter insoluble in boiling n-heptane, both given in Table 1, 300 parts by water, 0.3 part of extremely fine aluminum oxide particles (dispersing agent) and their corresponding foaming agent given in Table 1. The contents were heated with stirring and then were held at the temperature condition and for the prescribed time period, both shown in the same table. Thereafter, while maintaining the interior pressure of the vessel at 40 kg/cm$^2$(G) with nitrogen gas, one end of the vessel was opened to release the resin particles and water at once under the atmospheric pressure so that the resin particles were caused to expand to give pre-foamed particles. The apparent expansion ratio and the content $G_1$ of matter insoluble in boiling n-heptane of each of the thus-obtained pre-foamed particles are given in Table 1. Besides, the maximum interior temperature of the sealed vessel until each resin particle mixture was held at the temperature of the first step is also shown in Table 1.

Thereafter, the thus-obtained pre-foamed particle samples were each subjected to a pressurizing treatment by air so as to apply an intraparticle pressure of 1.5 kg/cm$^2$(G) to the pre-foamed particles. The thus-treated particle samples were each filled in a mold having internal dimensions of 300 mm × 300 mm × 50 mm. They were then heated by steam having the vapor pressure given in Table 1, whereby causing the pre-foamed particles to expand and hence obtaining molded articles. The thus-obtained molded articles were dried for 24 hours in an oven of 70° C. and then cooled gradually to room temperature. Thereafter, the dimensional accuracy of the molded articles were measured and their surface conditions were observed. In addition, the percent water absorption of each of the molded articles was also measured to determine whether its degree of fusion bond of the expanded particles in the molded article was good or not (the secondary foaming property of the pre-foamed particles). These results are also shown in Table 1.

TABLE 1

| | | Example 1 | Example 2 | Example 3 | Example 4 | Example 5 | Example 6 | Example 7 | Example 8 |
|---|---|---|---|---|---|---|---|---|---|
| Raw resin particles | Resin | Ethylene-propylene random copolymer (ethylene content: 3.5 wt. %) | Propylene-1-butene random copolymer (1-butene content: 2.5 wt. %) | Ethylene-propylene random copolymer (ethylene content: 3.5 wt. %) | Ethylene-propylene random copolymer (ethylene content: 3.5 wt. %) | Ethylene-propylene random copolymer (ethylene content: 2.8 wt. %) | Ethylene-propylene random copolymer (ethylene content: 2.8 wt. %) | Ethylene-propylene block copolymer (ethylene content: 20 wt. %) | Ethylene-propylene block copolymer (ethylene content: 13 wt. %) |
| | $T_E$ (°C) | 152 | 155 | 152 | 152 | 153 | 153 | 165 | 163 |
| | $T_m$ (°C) | 138 | 145 | 138 | 138 | 144 | 144 | 160 | 158 |
| | $G_2$ (%) | 0 | 0 | 0 | 0 | 35 | 35 | 88 | 45 |
| Foaming agent | Compound | Dichlorodifluoromethane Trichlorofluoromethane | Dichlorodifluoromethane | Dichlorodifluoromethane | Dichlorodifluoromethane | Dichlorodifluoromethane | Dichlorodifluoromethane | Dichlorodifluoromethane | Dichlorodifluoromethane |
| | Amount (parts by weight) | 10 / 10 | 18 | 17 | 14 | 19 | 17 | 18 | 20 |
| Holding temperature and Time | | 144° C. × 15 Min. 146° C. × 15 Min. | 135° C. × 30 Min. 145° C. × 30 Min. | 135° C. × 30 Min. 140° C. × 30 Min. | 138° C. × 30 Min. 140° C. × 30 Min. | 145° C. × 15 Min. 148° C. × 30 Min. | 140° C. × 15 Min. 145° C. × 15 Min. | 158° C. × 15 Min. 162° C. × 15 Min. | 155° C. × 30 Min. 159° C. × 30 Min. |
| Maximum temperature history subjected to until the 1st holding temperature | | 144° C. | 140° C. | 150° C. | 145° C. | 150° C. | 145° C. | 162° C. | 159° C. |
| Pre-foamed particles | Apparent expansion ratio (times) | 48 | 40 | 31 | 16 | 45 | 35 | 30 | 28 |
| | $G_1$ (%) | 15 | 35 | 48 | 55 | 50 | 63 | 100 | 63 |
| | $G_1-G_2$ (%) | 15 | 35 | 48 | 55 | 15 | 28 | 12 | 18 |
| Molding steam pressure (Kg/cm² · G) | | 3.0 | 2.8 | 3.0 | 3.0 | 3.2 | 3.2 | 5.2 | 5.0 |
| Molded article | Dimensional accuracy* | ○ | ○ | ○ | ○ | ○ | ○ | △ | △ |
| | Surface conditions** | ○ | ○ | ○ | ○ | ○ | ○ | △ | △ |
| | Degree of fusion bond*** | ○ | ○ | ○ | ○ | ○ | ○ | ○ | ○ |
| Overall evaluation | | ○ | ○ | ○ | ○ | ○ | ○ | △ | △ |

| | | Example 9 | comparative example 1 | comparative example 2 | comparative example 3 | comparative example 4 |
|---|---|---|---|---|---|---|
| Raw resin particles | Resin | Compounded resin of 95 wt. % ethylene-propylene random copolymer (ethylene content: 3.5 wt. %) and 5 wt. % EPDM | Ethylene-propylene random copolymer (ethylene content: 3.5 wt. %) | Ethylene-propylene random copolymer (ethylene content: 2.8 wt. %) | Ethylene-propylene random copolymer (ethylene content: 1.8 wt. %) | Ethylene-propylene random copolymer (ethylene content: 3.5 wt. %) |
| | $T_E$ (°C) | 152 | 152 | 153 | 158 | 152 |
| | $T_m$ (°C) | 138 | 138 | 144 | 153 | 138 |
| | $G_2$ (%) | 1 | 0 | 35 | 51 | 0 |
| Foaming agent | Compound | Dichlorodifluoromethane | Dichlorodifluoromethane | Dichlorodifluoromethane | Dichlorodifluoromethane | Dichlorodifluoromethane |
| | Amount (parts by weight) | 15 | 16 | 18 | 16 | 13 |
| Holding temperature and Time | | 133° C. × 15 Min. 138° C. × 15 Min. | 145° C. × 1 Min. | 148° C. × 30 Min. | 154° C. × 30 Min. | 144° C. × 30 Min. 162° C. × 30 Min. |

TABLE 1-continued

| | | 133° C. | 148° C. | 160° C. | 154° C. | 144° C. |
|---|---|---|---|---|---|---|
| Maximum temperature history subjected to until the 1st holding temperature | | 15 | 30 | 30 | 27 | 10 |
| Pre-foamed particles | Apparent expansion ratio (times) | | | | | |
| | $G_1$ (%) | 56 | 8 | 40 | 59 | 5 |
| | $G_1-G_2$ (%) | 55 | 8 | 5 | 8 | 5 |
| Molding steam pressure ($Kg/cm^2 \cdot G$) | | 3.0 | 3.0 | 3.2 | 4.8 | 3.0 |
| Molded | Dimensional accuracy* | ○ | △ | X | △ | △ |
| | Surface conditions** | ○ | △ | X | X | △ |
| | Degree of fusion bond*** | ○ | X | X | ○ | X |
| | Overall evaluation | ○ | X | X | X | X |

*The dimensional accuracy was judged in accordance with the following standard after measuring the shrinkage factor of each molded article along a surface thereof relative to the corresponding dimension of its corresponding mold.

Shrinkage
Smaller than 3%    ○
3% - Smaller than 4%    △
Greater than 4%    X

**Surface conditions were judged in accordance with the following standard after observing the surfaces of the molded articles
No surface shrinkage and wrinkles and smooth surface    ○
Some surface shrinkage    △
Considerable surface shrinkage    X

***Each degree of fusion bond was judged in accordance with the following standard after measuring the percent water absorption of the molded article by the JIS-K6767B method.

Percent of water absorption
Smaller than 0.003 g/cm³    ○
0.003 - smaller than 0.03 g/cm³    △
Greater than 0.03 g/cm³    X

Having now fully described the invention, it will be apparent to one of ordinary skill in the art that many changes and modifications can be made thereto without departing from the spirit or scope of the invention as set forth herein.

We claim:

1. Pre-foamed particles of a propylene-base resin obtained by foaming raw particles of the propylene-base resin, characterized in that the relation, $G_1-G_2 \geq 10\%$, exists between the content $G_1$ (%) of matter, which is contained in the pre-foamed particles and is insoluble in boiling n-heptane, and the content $G_2$ (%) of matter contained in the raw particles and insoluble in boiling n-heptane.

2. Pre-foamed particles according to claim 1, wherein the content $G_2$ (%) of the matter contained in the raw particles and insoluble in boiling n-heptane is 40% or less.

3. Pre-foamed particles according to claim 1, wherein the polypropylene-base resin is a random propylene copolymer.

4. Pre-foamed particles according to claim 1, wherein the polypropylene-base resin contains a rubber or thermoplastic elastomer.

5. Pre-foamed particles according to claim 1, wherein the content $G_1$ (%) of the matter contained in the pre-foamed particles and insoluble in boiling n-heptane is 20% or more.

6. Pre-foamed particles according to claim 1, wherein the relation, $G_1-G_2 \geq 15\%$, exists between the content $G_1$ (%) of matter, which is contained in the pre-foamed particles and is insoluble in boiling n-heptane, and the content $G_2$ (%) of matter contained in the raw particles and insoluble in boiling n-heptane.

* * * * *